`US008730126B2`

(12) United States Patent
Mo

(10) Patent No.: US 8,730,126 B2
(45) Date of Patent: May 20, 2014

(54) DUAL DISPLAY MODULE

(75) Inventor: Yao-An Mo, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 696 days.

(21) Appl. No.: 12/188,544

(22) Filed: Aug. 8, 2008

(65) Prior Publication Data

US 2009/0243960 A1 Oct. 1, 2009

(30) Foreign Application Priority Data

Mar. 26, 2008 (TW) ................................ 97110789 A

(51) Int. Cl.
*G09G 5/00* (2006.01)
(52) U.S. Cl.
USPC ............................... 345/1.3; 345/1.1; 345/102
(58) Field of Classification Search
USPC ........................................................ 345/102
See application file for complete search history.

(56) References Cited

U.S. PATENT DOCUMENTS

| 5,381,309 | A  | * | 1/1995  | Borchardt       | 362/612 |
|-----------|----|---|---------|-----------------|---------|
| 5,453,855 | A  | * | 9/1995  | Nakamura et al. | 349/58  |
| 6,871,975 | B2 | * | 3/2005  | Chuang          | 362/27  |
| 6,986,598 | B2 | * | 1/2006  | Chu et al.      | 362/561 |
| 7,001,059 | B2 | * | 2/2006  | Han et al.      | 362/616 |
| 7,111,974 | B2 | * | 9/2006  | Mizutani et al. | 362/607 |
| 7,237,939 | B2 | * | 7/2007  | Kim et al.      | 362/616 |
| 7,248,308 | B2 | * | 7/2007  | Mizutani et al. | 349/67  |
| 7,452,121 | B2 | * | 11/2008 | Cho et al.      | 362/633 |
| 7,629,957 | B2 | * | 12/2009 | Kim             | 345/102 |
| 7,637,648 | B2 | * | 12/2009 | Jung et al.     | 362/616 |
| 7,748,884 | B2 | * | 7/2010  | Yoshino et al.  | 362/631 |
| 7,768,596 | B2 | * | 8/2010  | You             | 349/73  |
| 7,837,376 | B2 | * | 11/2010 | Wu et al.       | 362/617 |
| 8,207,908 | B2 |   | 6/2012  | Yamazaki et al. |         |
| 2002/0191126 | A1 | * | 12/2002 | Sasuga et al. | 349/58 |
| 2003/0063456 | A1 | * | 4/2003  | Katahira      | 362/27 |
| 2003/0112217 | A1 | * | 6/2003  | Lee           | 345/102 |
| 2003/0227254 | A1 | * | 12/2003 | Terumoto      | 313/504 |
| 2004/0008506 | A1 | * | 1/2004  | Son           | 362/31 |
| 2004/0062027 | A1 | * | 4/2004  | Kim et al.    | 362/31 |
| 2006/0061704 | A1 | * | 3/2006  | Hayano et al. | 349/58 |
| 2006/0066227 | A1 | * | 3/2006  | Virnich et al.| 313/505 |
| 2006/0232204 | A1 | * | 10/2006 | Hu            | 313/519 |

(Continued)

FOREIGN PATENT DOCUMENTS

CN 1900783 1/2007
JP 2005-265924 9/2005

(Continued)

OTHER PUBLICATIONS

English language translation of abstract of TW I283316.

(Continued)

*Primary Examiner* — Amare Mengistu
*Assistant Examiner* — Sarvesh J Nadkarni
(74) *Attorney, Agent, or Firm* — McClure, Qualey & Rodack, LLP

(57) ABSTRACT

A dual display module for use in a display apparatus is provided. The dual display module includes a first display module, a first light source, a second display module, a second light source and a printed circuit board electrically connected with the first display module and the second display module. The second light source, which provides light to the second display module, is directly disposed onto the printed circuit board.

10 Claims, 5 Drawing Sheets

(56) References Cited

U.S. PATENT DOCUMENTS

| | | | |
|---|---|---|---|
| 2006/0232724 A1 | 10/2006 | Hsieh | |
| 2007/0081111 A1* | 4/2007 | Chang et al. | 349/62 |
| 2007/0146298 A1* | 6/2007 | Kim | 345/102 |
| 2007/0201248 A1* | 8/2007 | Jung et al. | 362/632 |
| 2008/0007669 A1* | 1/2008 | Chi | 349/58 |
| 2008/0106912 A1* | 5/2008 | Yeom | 362/613 |

FOREIGN PATENT DOCUMENTS

| | | | | |
|---|---|---|---|---|
| JP | 2005265924 A | * | 9/2005 | G09F 9/00 |
| TW | 200636345 A | | 10/2006 | |
| TW | 200725019 A | | 7/2007 | |
| TW | I283316 | | 7/2007 | |

OTHER PUBLICATIONS

English language translation of abstract of TW M309181.

English language translation of Chinese language office action dated Oct. 9, 2009.

Chinese language office action dated Oct. 9, 2009.

English language translation of abstract and pertinent parts of JP 2005-265924 (published Sep. 29, 2005).

English language translation of abstract of CN 1900783 (published Jan. 24, 2007).

Taiwan Office Action mailed Oct. 16, 2012.

* cited by examiner

DUAL DISPLAY MODULE

This application claims the benefit from the priority of Taiwan Patent Application No. 097110789 filed on Mar. 26, 2008, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a display module, and more particularly, relates to a dual display module for use in a display apparatus.

2. Descriptions of the Related Art

With the advancement of technologies and evolution of product specifications, many commercially available electronic products now have an additional display screen in addition to the primary display screen. The addition of the display screen improves the overall functionalities of an electronic product and provides the user with more conveniences. An example of such product is a clamshell style mobile phone, which has both an inner and an outer display screen. The inner screen, which is usually a display panel that has a larger size and higher definition, is adapted to display primary message frames when the user operates the mobile phone. On the other hand, the outer screen can display the time, incoming calls, pictures, motion pictures and the like; so that the user may be informed of such information in real time without need to open the flap of the mobile phone. Other examples include the palmtop game machines, which also have dual screens capable of displaying different frames to provide the player with adequate gaming information.

Aside from the aforesaid small sized portable apparatuses, notebook computers with a larger-size screen have also adopted the dual-display design. As shown in FIG. 1A, the notebook computer 10 has an outer screen 13 on the casing thereof in addition to the inner screen 11 of a larger size (as shown by the dashed line). When the display panel of the notebook computer 10 is closed, it is still possible for the user to acquire pertinent information from the outer screen 13, for example, incoming of e-mails or real-time messages.

A dual display module of the prior art simply manages to design two display modules into a display apparatus. In other words, two independent light sources and two independent display modules are combined together and then connected to a circuit board (not shown). Furthermore, in terms of the arrangement of the light sources, the solutions of the prior art typically bond the light source onto a flexible copper clad laminate (FCCL) to form a light bar, and then fix the light bar to a particular position during the subsequent assembling process.

FIG. 1B illustrates a side view of the dual display module of the prior art. The first display module 15 consists of a flexible circuit board 101a, a first panel 102a, a composite optical film 103a, a light guide plate 104a and a light bar 106a. Similarly, the second display module 17 comprises a flexible circuit board 101b, a second panel 102b, an optical film 103b, a light guide plate 104b and a light bar 106b. Additionally, the first display module 15 and the second display module 17 are disposed at both sides of a reflective plate 105 respectively, so that the reflective plate 105 reflects light from the light bars 106a, 106b to improve the light emergence percentages of the first display module 15 and the second display module 17. As a result, the luminance of the first display module 15 and the second display module 17 can be increased.

FIG. 1C further depicts a detailed structure of the light bars 106a, 106b, in which a plurality of light sources 107 (e.g., a plurality of light-emitting diodes) are disposed on an FCCL 107a to form a light source module. During the subsequent assembling process of the display apparatus, the light bars 106a, 106b are fixed into a particular position. However, during the process of assembling the light bars 106a, 106b, factors such as positions and electrical connections thereof should be taken into account, which causes a rather complex and inaccurate manufacturing process as well as increased manufacturing costs.

In summary, it is highly desirable in the art to provide a dual display module with a better structural design that allows an improvement to the manufacturing process of the display apparatus.

SUMMARY OF THE INVENTION

One objective of this invention is to provide a dual display module which has a portion of light sources disposed directly on a printed circuit board (PCB). The processes and materials for manufacturing the conventional light bar by previously disposing the light sources onto a flexible substrate can be economized. Moreover, because the light sources are fixed directly onto the PCB, it is unnecessary to consider the alignment and electrical connections of the light bar during the subsequent assembling process. As a result, the assembling process can be accomplished within a shorter time and at a lower cost.

Another objective of this invention is to provide a dual display module which selectively attaches light sources to the surface of a circuit board, thus leading to a simplified manufacturing process. Alternatively, the light sources may be disposed at the sides of the circuit board to further decrease the thickness of the display module, thus providing a display apparatus that is more competitive in the market.

This invention discloses a dual display module for use in a display apparatus, which comprises a first display module, a first light source, a second display module, a second light source and a printed circuit board (PCB). The first light source is adapted to provide light to the first display module, while the second light source is adapted to provide light to the second display module. The PCB is electrically connected with the first display module and the second display module, while the second light source is directly disposed onto the printed circuit board.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
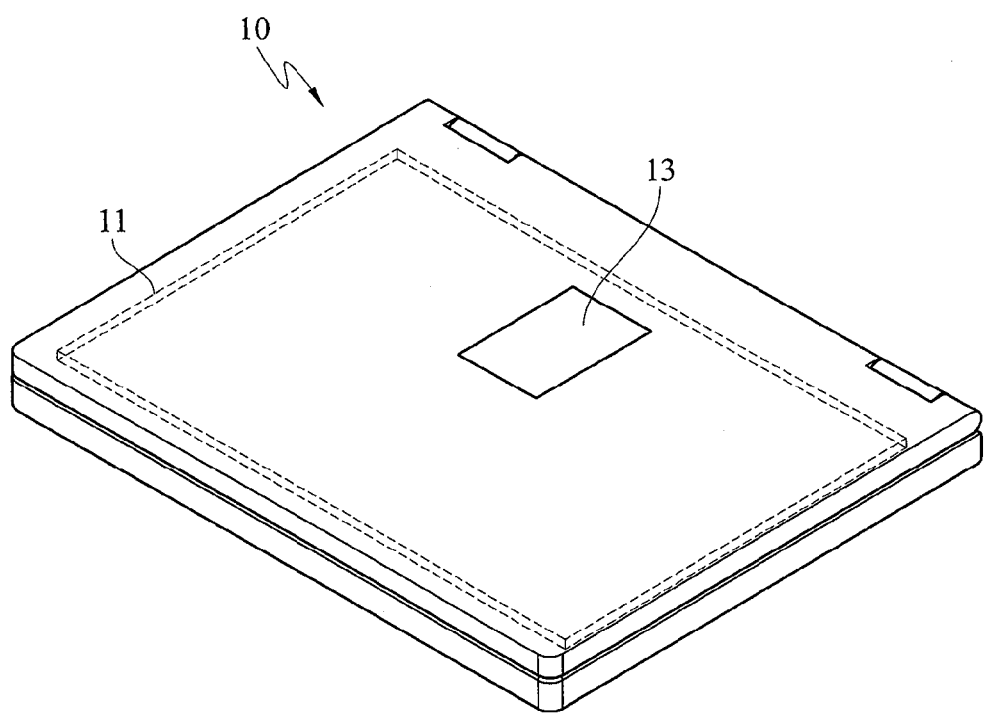
FIG. 1A is a schematic view of an apparatus incorporating a dual display module of the prior art.
Figure 1B:
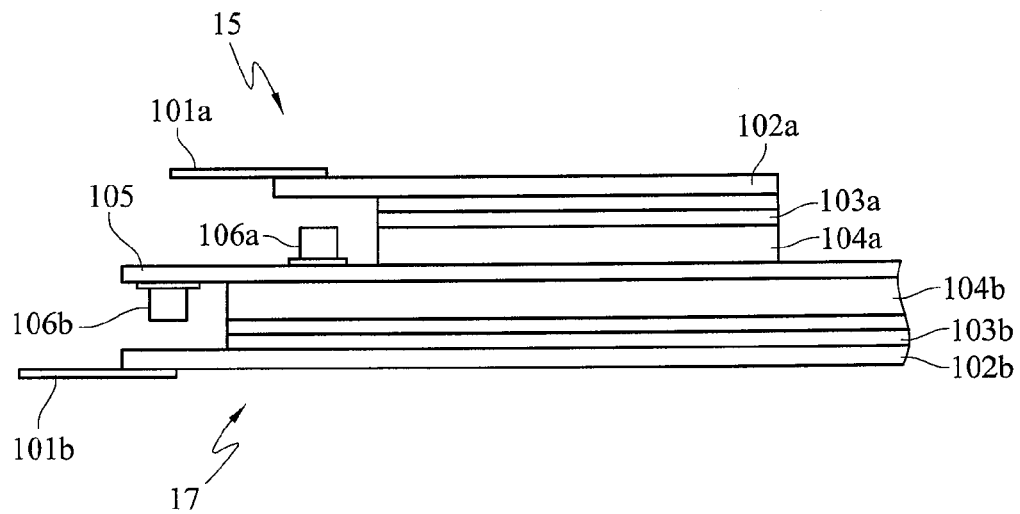
FIG. 1B is a schematic view of a conventional dual display module.
Figure 1C:
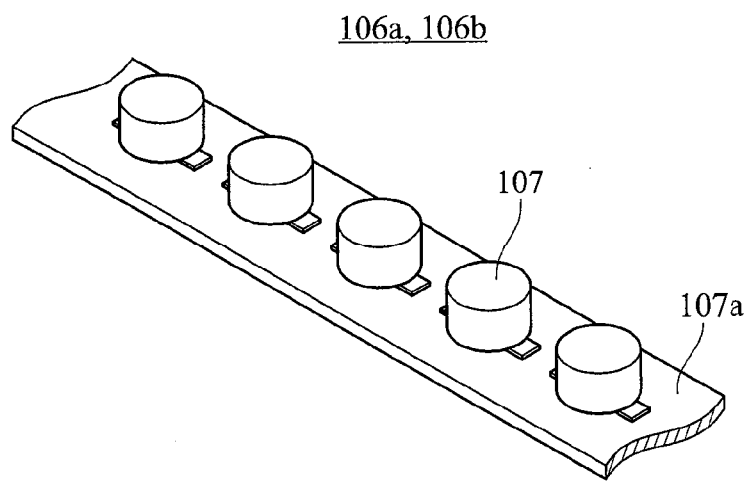
FIG. 1C is a schematic view of a conventional light source.
Figure 2:
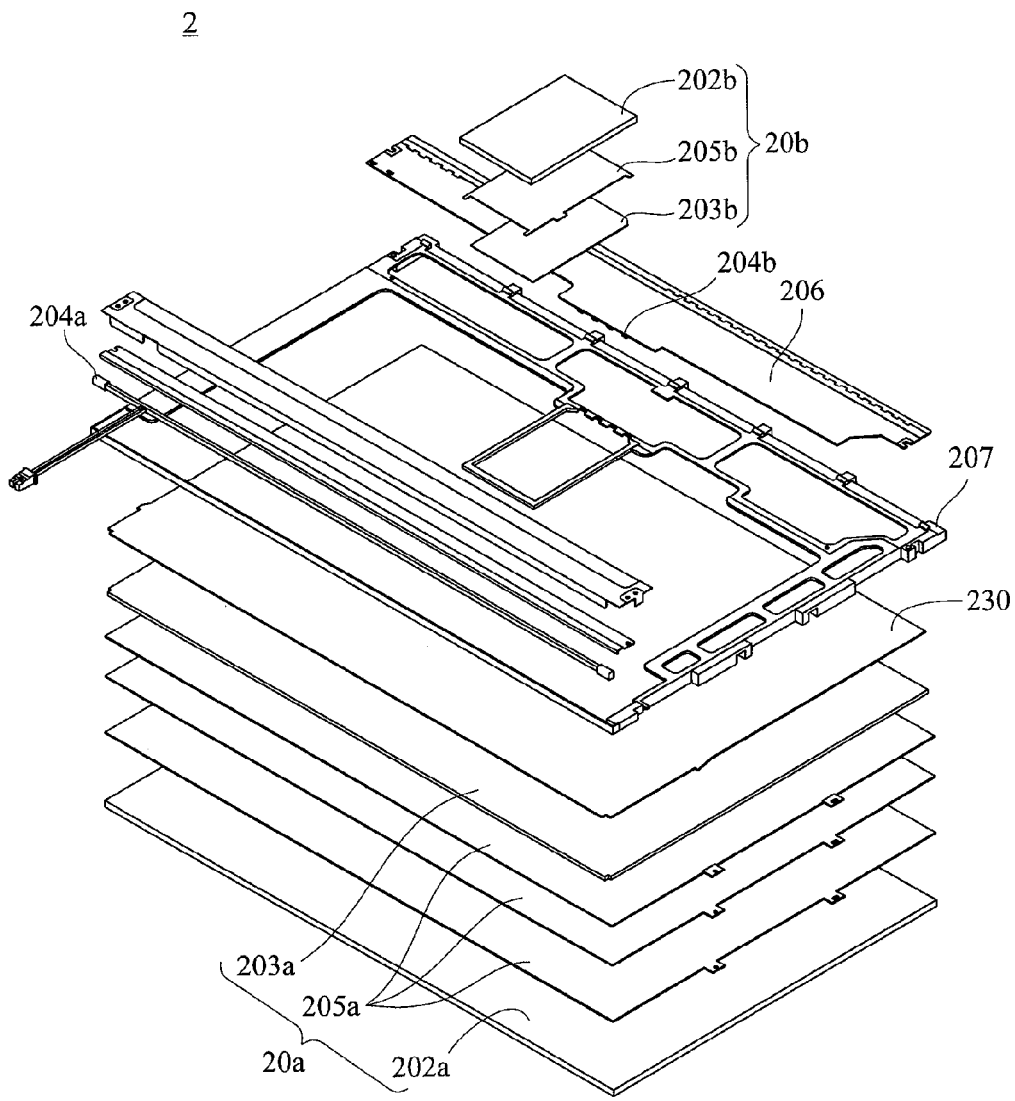
FIG. 2 is a schematic view of a dual display module of this invention.

A dual display module disclosed in this invention is depicted in FIG. 2. The dual display module 2 is adapted for use in a display apparatus, and comprises two display screens disposed on two opposite sides of the display apparatus respectively. In more detail, the dual display module 2 comprises a first display module 20a and a second display module 20b disposed on two opposite sides of the display apparatus respectively.

The first display module 20a depicted in FIG. 2 functions as a primary screen of the display apparatus, and therefore is depicted to have a larger display size. The first display module 20a comprises a first panel 202a, a first light guide plate 203a and a first optical film 205a stacked with one another. Additionally, the dual display module 2 further has a first light source 204a disposed therein for projecting light towards the first light guide plate 203a, to provide light to the first display module 20a for display purpose. In more detail, light emitted from the first light source 204a enters into the first light guide plate 203a to form a plane light source, and then propagates through the first optical film 205a and the first panel 202a to generate a display frame. The first light source 204a should be disposed on a flexible circuit board and comprised of a light-emitting diode (LED) or a cold cathode fluorescent lamp (CCFL). Although the CCFL is illustrated in FIG. 2 as an example, it is not intended to limit the scope of this invention, and the light sources may be selected according to the design requirements in practice.

Similarly, the second display module 20b comprises a second panel 202b, a second light guide plate 203b and a second optical film 205b stacked with one another. Additionally, the dual display module 2 further has a second light source 204b disposed therein for projecting light towards the first light guide plate 203a to provide light to the second display module 20b. In more detail, light emitted from the second light source 204b is adapted to enter into the second light guide plate 203b to form a plane light source, and then propagates through the second optical film 205b and the second panel 202b to generate a display frame. The second light source 204b may be an LED or an organic light-emitting diode (OLED). The LED is depicted as the second light source 204b in FIG. 2, although it is not intended to limit the scope of this invention.

The PCB 206 also has a first control circuit and a second control circuit thereon, which are electrically connected with the first display module 20a and the second display module 20b to transmit control signals to the first display module 20a and the second display module 20b respectively. In the above description and drawings, the first control circuit and the second control circuit are integrated on the PCB 206. However, as will be readily appreciated by those of ordinary skill in the art, this invention is not limited thereto, and the first control circuit and the second control circuit may also be disposed on two separate PCBs respectively.

The first display module 20a, the second display module 20b and the PCB 206 may be assembled onto a frame 207. Particularly, the first display module 20a and the second display module 20b are disposed at two opposite sides of the frame 207 to form a dual display structure at both sides of the display apparatus.

The dual display module 2 of this invention further comprises a reflection module 230 disposed between the first display module 20a and the second display module 20b. The reflection module, which may be a conventional reflector, typically exhibits the reflective property at both sides, for example, with the first and the second reflection surfaces. More specifically, the first reflection surface of the reflection module 230 is oriented towards the first display module 20a while the second reflection surface is oriented towards the second display module 20b to increase the utilization rate of the light emitted from the first light source 204a and the second light source 204b respectively and improve the luminance of the screens.

Figure 3A:
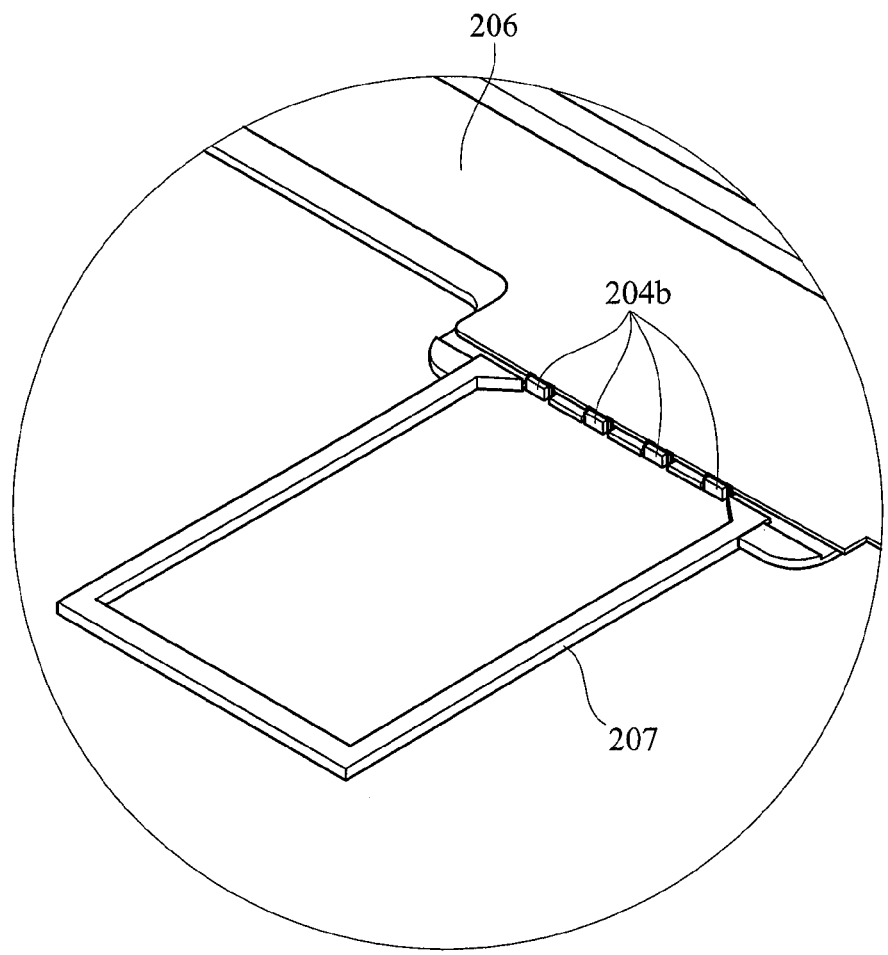
FIG. 3A is a schematic view of the arrangement of light sources in an embodiment of this invention.
Figure 3B:
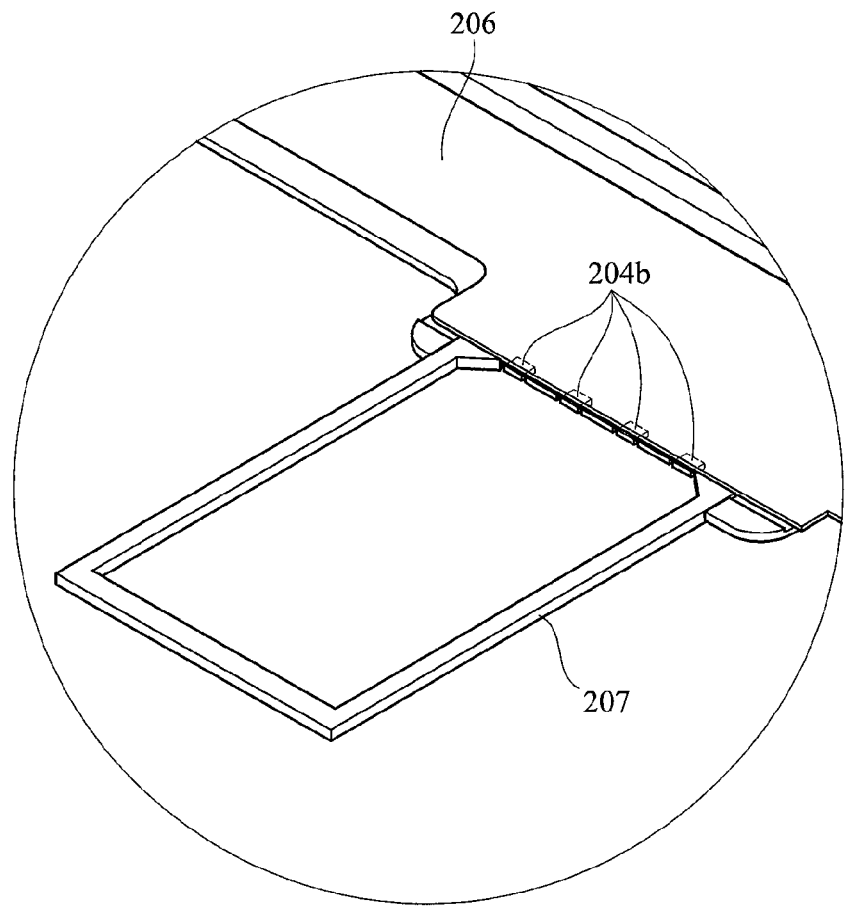
FIG. 3B is a schematic view of the arrangement of light sources in another embodiment of this invention.

This invention is unique in that the second light source 204b is disposed directly on the PCB 206. In this way, the second light source 204b can be fixed directly onto the PCB 206 instead of being fabricated into a light bar beforehand, thus simplifying the manufacturing process and lowering the cost by eliminating subsequent steps of positioning and electrically connecting the light bars. As shown in FIGS. 3A and 3B, the second light source 204b can be positioned at a predetermined location by simply attaching the PCB 206 with the second light source 204b directly to the frame 207. The manner in which the second light source 204b is fixed may vary according to practical requirements. For example, the second light source 204b of FIG. 3A is disposed on the side of the PCB 206. However, in another example as shown in FIG. 3B, the second light source 204b is disposed on the surface of the PCB 206 at the same side as the second display module 20b to facilitate the supply of light to the second display module 20b. Disposing the second light source 204b on the side of the PCB 206 helps to decrease the overall thickness of the dual display module 2 to provide a thinner display apparatus. On the other hand, disposing the second light source 204b on the bottom surface of the PCB 206 helps to simplify the manufacturing process. Therefore, the location of the second light source 204b is determined according to the design requirements. It should be noted that the locations of the second light source 204b are only described and shown for the purpose of illustration, and those skilled in the art may make changes on the locations according to practical requirements.

In summary, by disposing the second light source directly onto the circuit board without need of fabricating the light source into a light bar beforehand, this invention eliminates the need for materials of the light bar as well as the positioning and electrically connecting steps. Consequently, by simply fixing the circuit board onto a frame during the assembly process, this invention effectively simplifies the assembling process and lowers the manufacturing costs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A dual display module for use in a display apparatus, the dual display module comprising:
   a first display module;
   a first light source being adapted to provide lights to the first display module;
   a second display module;
   a second light source being adapted to provide lights to the second display module; and
   a reflection module being disposed between the first display module and the second display module, wherein the reflection module has a first reflection surface being formed in order to reflect lights from the first light source toward the first display module, and a second reflection surface being formed in order to reflect lights from the second light source toward the second display module;

a frame peripherally accommodating the first display module, the reflection module and the second display module;

a printed circuit board being disposed within a portion of the frame to be electrically connected with the first display module and the second display module, wherein the printed circuit board comprises an upper surface, a lower surface and a side surface facing toward the second display module;

wherein the second light source is directly disposed on the side surface of the printed circuit board defining a board thickness, wherein the second light source has a height substantially equal to the board thickness of the printed circuit board.

2. The dual display module as claimed in claim 1, wherein the second light source comprises a light-emitting diode (LED) or an organic light-emitting diode (OLED).

3. The dual display module as claimed in claim 1, wherein the first light source is selected from the group of a light-emitting diode and a cold cathode fluorescent lamp (CCFL).

4. The dual display module as claimed in claim 1, further comprising a flexible printed circuit board, wherein the first light source is disposed on the flexible printed circuit board.

5. The dual display module as claimed in claim 1, wherein the printed circuit board comprises a first control circuit electrically connecting to the first display module.

6. The dual display module as claimed in claim 5, wherein the printed circuit board further comprises a second control circuit electrically connecting to the second display module.

7. The dual display module as claimed in claim 1, wherein the first display module further comprises:
a first light guide plate;
a first optical film; and
a first panel;
wherein the first light guide plate, the first optical film and the first panel are stacked with one another.

8. The dual display module as claimed in claim 1, wherein the second display module further comprises:
a second light guide plate;
a second optical film; and
a second panel;
wherein the second light guide plate, the second optical film and the second panel are stacked with one another.

9. The dual display module as claimed in claim 1, wherein the light from the first light source are reflected by the first reflection surface and does not pass through the reflection module.

10. The dual display module as claimed in claim 1, wherein the light from the second light source are reflected by the second reflection surface does not pass through the reflection module.

* * * * *